United States Patent
Yang et al.

(10) Patent No.: US 8,968,693 B2
(45) Date of Patent: Mar. 3, 2015

(54) INTERNAL CYCLONE FOR FLUIDIZED BED REACTOR

(71) Applicant: Honeywell International Inc., Morristown, NJ (US)

(72) Inventors: Terris Yang, East Amherst, NY (US); Robert Johnson, Lancaster, NY (US); Hsueh Sung Tung, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/975,817

(22) Filed: Aug. 26, 2013

(65) Prior Publication Data

US 2014/0065049 A1   Mar. 6, 2014

Related U.S. Application Data

(60) Provisional application No. 61/695,179, filed on Aug. 30, 2012.

(51) Int. Cl.
*C01G 43/06* (2006.01)
*B01J 8/24* (2006.01)
(Continued)

(52) U.S. Cl.
CPC . *B01J 8/24* (2013.01); *C01G 43/06* (2013.01); *B01J 8/1827* (2013.01); *B01J 8/0055* (2013.01); *F23C 10/08* (2013.01); *B01J 2208/00681* (2013.01); *B01J 2208/00752* (2013.01); *B01J 2208/00761* (2013.01)
USPC .............................. 423/259; 422/139; 422/145

(58) Field of Classification Search
CPC ...................................................... F23C 10/08

USPC ................................... 423/259; 422/139, 145
IPC ......................................................... F23C 10/08
See application file for complete search history.

(56) References Cited

U.S. PATENT DOCUMENTS

| 2,700,641 A | 1/1955 | Rehbin |
| 2,934,494 A | 4/1960 | Kleiber |

(Continued)

FOREIGN PATENT DOCUMENTS

| EP | 0094488 B1 | 10/1986 |
| EP | 0211483 A2 | 2/1987 |

(Continued)

OTHER PUBLICATIONS

PCT ISR & Written Opinion issued in PCT/US2013/056723 dated Jan. 8, 2014.

*Primary Examiner* — Paul Wartalowicz
(74) *Attorney, Agent, or Firm* — Faegre Baker Daniels LLP

(57) ABSTRACT

A fluidized bed reactor comprising a reaction column having a fluid portion; a gas inflow means for flowing a gas upwardly from the fluid portion of the reaction column; a particle feed means for feeding particles to the fluid portion of the reaction column; a cyclone capable of separating particles from the gas flowing upwardly from the fluid portion of the reaction column, the cyclone being located within the reaction column and being in communication with the gas flowing upwardly, wherein the cyclone comprises a cyclone body having an inlet, a gas outlet, and a particle drop port; and a particle discharge pipe having an upper part connected to the particle drop port of the cyclone body, and a lower part, wherein the particle discharge pipe is located substantially outside of the reaction column.

19 Claims, 1 Drawing Sheet

(51) Int. Cl.
  *B01J 8/18* (2006.01)
  *B01J 8/00* (2006.01)
  *F23C 10/08* (2006.01)

(56) References Cited

U.S. PATENT DOCUMENTS

| | | | |
|---|---|---|---|
| 3,817,872 A | | 6/1974 | Evans et al. |
| 3,888,733 A | * | 6/1975 | Grimmett et al. ............. 376/174 |
| 4,867,948 A | | 9/1989 | Ruottu |
| 5,150,511 A | * | 9/1992 | Sakata et al. ................. 29/603.2 |
| 5,776,416 A | | 7/1998 | Oda |
| 6,918,397 B2 | * | 7/2005 | Lin et al. .................... 134/22.18 |
| 7,144,447 B2 | | 12/2006 | Nagl et al. |
| 2005/0166457 A1 | | 8/2005 | Steer |
| 2006/0147355 A1 | * | 7/2006 | Beech et al. .................. 422/139 |

FOREIGN PATENT DOCUMENTS

| | | |
|---|---|---|
| GB | 762062 | 11/1956 |
| WO | 9009841 A1 | 9/1990 |
| WO | WO00/34531 | 6/2000 |

* cited by examiner

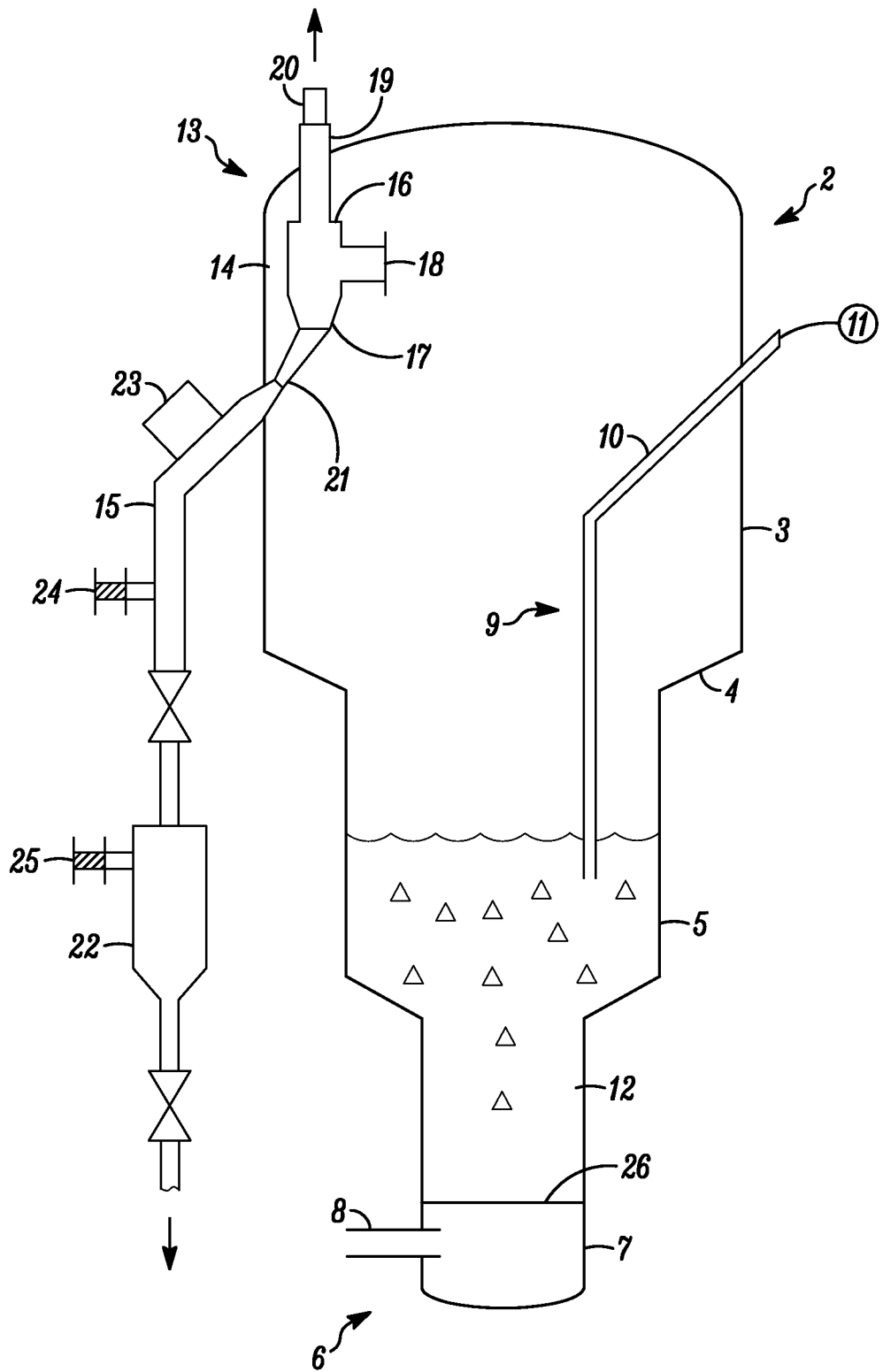

INTERNAL CYCLONE FOR FLUIDIZED BED REACTOR

CROSS REFERENCE TO RELATED APPLICATION

The present application claims priority under 35 U.S.C. §119(e) to U.S. Provisional Patent Application No. 61/695,179, filed on Aug. 30, 2012, the disclosure of which is incorporated herein by reference in its entirety.

FIELD OF THE INVENTION

This invention relates to an improved fluidized bed reactor equipped with an internal cyclone that is connected to a particle discharge pipe located substantially outside of the reaction column.

BACKGROUND OF THE INVENTION

A fluidized bed reactor (FBR) is a type of reactor device that can be used to carry out a variety of multiphase chemical reactions. In this type of reactor, a fluid (gas or liquid) is passed through a granular solid material (usually a catalyst possibly shaped as tiny spheres) at high enough velocities to suspend the solid and cause it to behave as though it were a fluid. This process, known as fluidization, imparts many important advantages to the fluidized bed reactor. The fluidized bed reactor can thus be used in many industrial applications. Fluidized bed reactors are often used to produce gasoline and other fuels, along with many other chemicals. Many industrially produced polymers are made using fluidized bed reactor technology, such as rubber, vinyl chloride, polyethylene, styrenes, and polypropylene. Fluidized bed reactors are used in various utilities, for example in nuclear power plants and water and waste treatment settings; fluidized bed reactors are also used for coal gasification. Fluidized bed reactors used in these applications allow for processes that are cleaner and more efficient than previous standard reactor technologies.

In conventional fluidized bed reactors, an internal cyclone is often used to separate fine particles from the gas that moves upwards in the fluidized bed reactor during its standard operation. The advantage of such an internal cyclone over a cyclone that is located outside the reactor is that the internal cyclone can be heated up to the process temperature by the process gas without the need of an external heat source. Additionally, the inlet of the internal cyclone will not be easily clogged due to the high temperature of the process gas.

The cyclone is often connected to a discharge pipe that is located within the fluidized bed reactor and channels captured particles back towards the bottom of the reactor. The drawback of this type of setup is that the up-flowing fluidizing gas may bypass the cyclone's inlet and enter the internal cyclone via its discharge pipe. Another drawback is that the whole fluidized bed reactor system must be shut down in case the discharge pipe must be accessed and cleaned because it is clogged. Additionally, the removal of captured fine particles from these types of systems is often difficult.

Thus, there remains a need for a fluidized bed reactor with an improved design that allows the cleaning of a clogged discharge pipe while the fluidized bed reactor is still in operation. The present invention addresses this need.

SUMMARY OF THE INVENTION

The present invention provides a fluidized bed reactor comprising a reaction column having a fluid portion; gas inflow means for flowing a gas upwardly through the fluid portion of the reaction column; particle feed means for feeding particles to the fluid portion of the reaction column; and a cyclone capable of separating particles from the gas flowing upwardly from the fluid portion of the reaction column. The cyclone is located within the reaction column and is in communication with the gas flowing upwardly; and the cyclone comprises a cyclone body having a gas intake opening, a gas outflow opening, and a particle drop port. The cyclone also has a particle discharge pipe having an upper part connected to the particle drop port of the cyclone body, and a lower part; wherein the particle discharge pipe is located substantially outside of the reaction column.

In certain embodiments of the present invention, the fluidized bed reactor further comprises a knock-out pot attached to the lower part of the particle discharge pipe and located outside of the reaction column, wherein the knock-out pot is capable of collecting particles discharged from the particle discharge pipe.

In other embodiments of the present invention, the fluidized bed reactor further comprises a vibrator attached to the particle discharge pipe and located outside of the reaction column, wherein the vibrator is capable of removing solids that have accumulated in the particle discharge pipe.

In even other embodiments of the present invention, the fluidized bed reactor further comprises a high pressure $N_2$ purge line attached to the particle discharge pipe and located outside of the reaction column, wherein the high pressure $N_2$ purge line is capable of removing heavy cloggage in the particle discharge pipe.

In even other embodiments of the present invention, the particle discharge pipe or the knock-out pot, or both, comprise means for heat insulation.

The present invention also provides a method of producing $UF_4$, comprising reacting $UO_2$ with HF gas in any of the fluidized bed reactors discussed above.

BRIEF DESCRIPTION OF THE FIGURES

FIG. 1 represents a sectional view of an improved fluidized bed reactor with an internal cyclone according to the present invention.

DETAILED DESCRIPTION OF THE INVENTION

The invention relates to an improved fluidized bed reactor equipped with a cyclone that is located within the fluidized bed reactor's reaction column and that is connected to a particle discharge pipe located substantially outside of said reaction column. As a result of this modification, the fluidized bed reactor of the present invention operates more efficiently because the particle discharge pipe can be cleaned while the fluidized bed reactor is still in operation.

An embodiment of a fluidized bed reactor constructed in accordance with the present invention will now be described in detail with reference to the accompanying drawing (FIG. 1).

In FIG. 1, a fluidized bed reactor designated by numeral 1 operates according to the fluidized bed principles generally known in the art. The fluidized bed reactor has a reaction column 2, which extends substantially vertically, and which has a free board portion 3 of a relatively large-diameter cylindrical shape, a taper portion 4 of an inverted truncated conical tubular shape, and a fluid portion 5 of a relatively small-diameter cylindrical shape. A lower end part of the reaction column 2 is provided with gas inflow means 6. The gas inflow means 6 include a gas chamber 7 disposed at the lower end part of the reaction column 2, and a gas inflow pipe 8 in connection with the gas chamber 7. Gases are fed to the gas chamber 7 through the gas inflow pipe 8, and then flow upwardly through the gas distributor 26 and inside the reaction column 2. The reaction column 2 is also provided with particle feed means 9. The particle feed means 9 include a particle feed pipe 10 which advances into the reaction column 2 through the peripheral wall of the free board portion 4 of the reaction column 2 and extends downwardly into the fluid portion 5 of the reaction column 2. The particle feed pipe 10 is connected to a particle feed source 11 which supplies particles at a predetermined rate to the particle feed pipe 10 which feeds the particles into a lower part of the reaction column 2, i.e., the fluid portion 5. Thus, a main fluidized bed 12 of particles is formed in the fluid portion 5 of the reaction column 2. The reaction column 2, the gas inflow means 6, including the gas chamber 7 and the gas inflow pipe 8, and the particle feed pipe 10 may be made of any suitable material, such as stainless steel or high nickel alloy.

The reaction column 2 is further equipped with a cyclone 13. The cyclone 13 includes a cyclone body 14 that is connected to a particle discharge pipe 15. In FIG. 1, the cyclone body 14 is entirely disposed within the reaction column 2, whereas the particle discharge pipe 15 is located substantially outside the reaction column 2. The cyclone body 14 has a nearly cylindrical upper part 16 (wider end), and a conical lower part 17 (narrow end). A gas intake opening 18 is located in the peripheral wall of the upper part 16 of the cyclone body 14, and a gas outflow opening 19 is located in the top wall of the upper part 16. The cyclone body 14 is positioned in the upper part of the reaction column 2, i.e., the free board portion 3, and its gas intake opening 18 is open towards the free board portion 3 of the reaction column 2. An outlet pipe 20 is connected to the gas outflow opening 19 of the cyclone body 14, and this outlet pipe 20 extends through the top wall of the reaction column 2. The bottom wall of the lower part 17 of the cyclone body 14 is opened throughout to form a particle drop port 21. The particle discharge pipe 15 is formed of a slenderly extending cylindrical member, and its upper end is connected to the particle drop port 21. Thus, the upper end of the particle discharge pipe 15 is in communication with the particle drop port 21 of the cyclone body 14. The cyclone body, and particle discharge pipe may be made of any suitable material, such as stainless steel or high nickel alloy.

The fluidized bed reactor 1 is further equipped with a knock-out pot 22 connected to the lower part of the particle discharge pipe 15 outside of the reaction column 2 for collecting particles discharged from the particle discharge pipe. The fluidized bed reactor 1 may also include a vibrator 23 that is attached to the particle discharge pipe 15 outside of the reaction column 2 for removing any accumulated solids in the discharge pipe. The fluidized bed reactor 1 may preferably also include a high pressure $N_2$ purge line 24 that is attached to the particle discharge pipe 15 outside of the reaction column for removing any heavy cloggage in the pipe. The knock-out pot 22 may further include a $N_2$ bump 25 for periodically freeing up space inside the knock-out pot. The particle discharge pipe 15 and the knock-out pot 22 of the fluidized bed reactor outside of the reaction column can be well insulated and/or heat traced to prevent the condensation of gases and evaporation of low boiling point compounds.

The workings of the above-described fluidized bed reactor are described using the hydrofluorination of uranium dioxide ($UO_2$) to uranium tetrafluoride ($UF_4$) as an example. When hydrogen fluoride gas (HF) flows into the reaction column 2 through the gas inflow pipe 8 and into the gas chamber 7, it ascends inside the reaction column 2 past the main fluidized bed 12 of $UO_2$ particles. While the gas is ascending through the main fluidized bed 12 in the reaction column 2, solid $UO_2$ reacts with gaseous HF to produce solid $UF_4$ and $H_2O$ gas according to the following reaction formula: $UO_2(s)+4HF(g) \rightarrow UF_4(s)+2H_2O(g)$. The relatively small-diameter particles of the $UO_2$ and $UF_4$ constituting the main fluidized bed 12 accompany the ascending gas stream, and flow upwardly from the main fluidized bed 12. The linear velocity of the gas gradually decreases while the gas is moving upwards across the taper portion 4 with an upwardly gradually increasing sectional area. Thus, the particles other than considerably small particles are separated from the ascending gas stream, and fall back into the main fluidized bed 12. In the free board portion 3 of the reaction column 2, the gas accompanied by small-diameter $UO_2$ and $UF_4$ particles enters the cyclone body 14 through the gas intake opening 18. In the cyclone body 14, the small-diameter particles accompanying the gas are separated from the gas by the cyclone 13, which works based on principles that are generally known in the art and that are therefore not further described herein. The gas accompanied only by fine particles is discharged through the outlet pipe 20 through the gas outflow opening 19. The small-diameter particles separated from the gas in the cyclone body 14 fall through the particle drop port 21 and through to the particle discharge pipe 15 that is located substantially outside of the reaction column 2.

In a preferred embodiment of the present invention, a knock-out pot 22 is attached to the lower part of the particle discharge pipe 15 outside of the reaction column 2 and used to collect the particles discharged from the particle discharge pipe; knock-out pot 22 also supplies a seal that prevents process gas from escaping from the reactor system through the cyclone. In certain embodiments of the present invention, the knock-out pot 22 further includes a $N_2$ bump 25 for periodically freeing up space inside the knock-out pot. In certain embodiments of the present invention, the knock-out pot 22 further includes a vent line (not shown in FIG. 1) which is applied to release pressure buildup when necessary or for maintenance purposes.

In certain embodiments of the present invention, a vibrator 23 is attached to the particle discharge pipe 15 outside of the reaction column 2 and used for removing any accumulated solids from the discharge pipe.

In certain embodiments of the present invention, a high pressure $N_2$ purge line 24 is attached to the particle discharge pipe 15 outside of the reaction column and is used for the purpose of removing any heavy cloggage in the pipe.

In certain embodiments of the present invention, the particle discharge pipe 15 and the knock-out pot 22 of the cyclone outside of the reaction column are well insulated and/or heat traced to prevent the condensation of gases and evaporation of low boiling point compounds.

In a preferred embodiment of the present invention, the cyclone body 14 is installed in close proximity to the wall of the reaction column 2 to reduce the leg length inside the reaction column. The bottom conical section of the cyclone will be modified as follows: straight on the side against the reactor wall and angled on the other side so that the fines can flow out to the discharge pipe 15 with less obstacle. A $N_2$ purge line 24 will be installed to prevent any pluggage in the discharge leg. The knock-out pot 22 will be bumped periodically to free up the space inside the knock-out pot. A vent line will also be applied to release pressure buildup in case of emergency or for maintenance purpose.

In the present invention, the dimensions of the cyclone can be calculated based on the actual operating conditions, such as gas flow rate, solid holdup in the gas flow and solid capture efficiency of the cyclone

What is claimed is:

1. A fluidized bed reactor comprising:
a reaction column having a fluid portion;
gas inflow means for flowing a gas upwardly through the fluid portion of the reaction column;
particle feed means for feeding particles to the fluid portion of the reaction column;
a cyclone capable of separating particles from the gas flowing upwardly from the fluid portion of the reaction column, the cyclone being located within the reaction column and being in communication with the gas flowing upwardly; wherein the cyclone comprises a cyclone body having a gas intake opening, a gas outflow opening, and a particle drop port;
a particle discharge pipe having an upper part connected to the particle drop port of the cyclone body, and a lower part; wherein the particle discharge pipe is located substantially outside of the reaction column; and
a knock-out pot attached to the lower part of the particle discharge pipe and located outside of the reaction column, wherein the knock-out pot is capable of collecting particles discharged from the particle discharge pipe.

2. The fluidized bed reactor of claim 1, wherein the reaction column further includes a free board portion and a taper portion, the taper portion being positioned between the fluid portion and the free board portion.

3. The fluidized bed reactor of claim 2, wherein the free board portion has a larger diameter than the fluid portion.

4. The fluidized bed reactor of claim 2, wherein the cyclone body is positioned in the free board portion.

5. The fluidized bed reactor of claim 1, wherein the particles fed by the particle feed means to the fluid portion of the reactor react with the gas to form product particles, the gas comprises hydrogen fluoride, the particles comprise uranium dioxide, and the product particles comprise uranium tetrafluoride.

6. The fluidized bed reactor of claim 5, wherein the cyclone is capable of separating small-diameter particles of uranium dioxide and uranium tetrafluoride from fine particles of uranium dioxide and uranium tetrafluoride and the gas.

7. The fluidized bed reactor of claim 1, further comprising a vibrator attached to the particle discharge pipe and located outside of the reaction column, wherein the vibrator is capable of removing solids that have accumulated in the particle discharge pipe.

8. The fluidized bed reactor of claim 1, further comprising a high pressure N2 purge line attached to the particle discharge pipe and located outside of the reaction column, wherein the high pressure N2 purge line is capable of removing heavy cloggage in the particle discharge pipe.

9. The fluidized bed reactor of claim 1, wherein the particle discharge pipe or the knock-out pot, or both, comprise means for heat insulation.

10. The fluidized bed reactor of claim 1, wherein the knock-out pot further comprises a vent line.

11. The fluidized bed reactor of claim 1, wherein the reaction column includes a wall, the cyclone body being positioned in close proximity to the wall.

12. The fluidized bed reactor of claim 1, wherein the particle feed means are configured to supply the particles at a predetermined rate.

13. A method of producing $UF_4$, comprising reacting $UO_2$ with HF gas in the fluidized bed reactor of claim 1.

14. A fluidized bed reactor comprising:
a reaction column having a fluid portion;
a gas source configured to provide a gas to the fluid portion of the reaction column;
a particle feed pipe configured to provide particles to the fluid portion of the reaction column;
a cyclone including a cyclone body having a gas intake opening, a gas outflow opening, and a particle drop port connected to a particle discharge pipe, the cyclone configured to separate particles from gas in the fluid portion of the reaction column;
a knock-out pot for collecting particles attached to the particle discharge pipe and located outside of the reaction column;
wherein the cyclone is located within the reaction column and the particle discharge pipe is located substantially outside of the reaction column.

15. The fluidized bed reactor of claim 14, further comprising a first valve positioned between the particle discharge pipe and the knock-out pot and a second valve positioned downstream of the knock-out pot.

16. The fluidized bed reactor of claim 15, further comprising a vibrator attached to the particle discharge pipe and located outside of the reaction column, wherein the vibrator is capable of removing solids that have accumulated in the particle discharge pipe.

17. The fluidized bed reactor of claim 15, further comprising a high pressure purge line attached to the particle discharge pipe and located outside of the reaction column, wherein the high pressure purge line is capable of removing heavy cloggage in the particle discharge pipe.

18. The fluidized bed reactor of claim 15, wherein the particle discharge pipe includes at least one of heat insulation and a heat trace.

19. The fluidized bed reactor of claim 15, wherein the knock-out pot includes at least one of heat insulation and a heat trace.

* * * * *